(12) United States Patent
Yamazaki et al.

(10) Patent No.: US 11,965,571 B2
(45) Date of Patent: Apr. 23, 2024

(54) METHOD FOR MANUFACTURING SPRING AND SPRING

(71) Applicant: MITSUBISHI STEEL MFG. CO., LTD., Tokyo (JP)

(72) Inventors: Tomohiro Yamazaki, Ichihara (JP); Fumihiro Kino, Ichihara (JP); Yoshizumi Fukuda, Ichihara (JP); Yuji Soda, Ichihara (JP)

(73) Assignee: MITSUBISHI STEEL MFG. CO., LTD., Tokyo (JP)

(*) Notice: Subject to any disclaimer, the term of this patent is extended or adjusted under 35 U.S.C. 154(b) by 678 days.

(21) Appl. No.: 17/052,240

(22) PCT Filed: May 9, 2019

(86) PCT No.: PCT/JP2019/018600
§ 371 (c)(1),
(2) Date: Nov. 2, 2020

(87) PCT Pub. No.: WO2019/216383
PCT Pub. Date: Nov. 14, 2019

(65) Prior Publication Data
US 2021/0140502 A1    May 13, 2021

(30) Foreign Application Priority Data
May 9, 2018   (JP) .................. 2018-090926

(51) Int. Cl.
*F16F 1/04*     (2006.01)
*B21F 35/00*    (2006.01)
(Continued)

(52) U.S. Cl.
CPC ............... *F16F 1/04* (2013.01); *B21F 35/00* (2013.01); *G01L 1/042* (2013.01); *G01L 1/25* (2013.01);
(Continued)

(58) Field of Classification Search
CPC ........ F16F 1/04; F16F 1/02; F16F 1/06; F16F 1/14; F16F 1/18; F16F 1/32;
(Continued)

(56) References Cited

U.S. PATENT DOCUMENTS

2014/0306389 A1   10/2014   Ikai et al.
2017/0082561 A1   3/2017    Yasukawa

FOREIGN PATENT DOCUMENTS

CN    1320346 C      6/2007
CN    103076122      5/2013
(Continued)

OTHER PUBLICATIONS

Suzuki, "Proposal for a direct-method for stress measurement using an X-ray area detector", Jul. 2017, NDT & E International vol. 92, Dec. 2017, pp. 104-110 (Year: 2017).*
(Continued)

*Primary Examiner* — Ryan J. Walters
(74) *Attorney, Agent, or Firm* — Carlson, Gaskey & Olds, P.C.

(57) ABSTRACT

Provided is a method of manufacturing a spring for inspecting the stress distribution of the spring under load. The method for manufacturing a spring (1) includes the steps of applying a load to the spring (1), measuring the stress of the spring (1) under the load, and releasing the load applied to the spring (1), the measuring the stress of the spring (1) being made by measuring the stress on the surface of the active part of the spring (1) using X-ray diffraction with the cos α method, and the method further including the step of determining whether the magnitude of the stress of the spring (1) meets a criterion.

4 Claims, 6 Drawing Sheets

(51) Int. Cl.
*G01L 1/04* (2006.01)
*G01L 1/25* (2006.01)
*F16F 1/02* (2006.01)
*F16F 1/06* (2006.01)
*F16F 1/14* (2006.01)
*F16F 1/18* (2006.01)
*F16F 1/32* (2006.01)
*G01L 5/00* (2006.01)

(52) U.S. Cl.
CPC . *F16F 1/02* (2013.01); *F16F 1/06* (2013.01); *F16F 1/14* (2013.01); *F16F 1/18* (2013.01); *F16F 1/32* (2013.01); *F16F 2226/04* (2013.01); *F16F 2230/0047* (2013.01); *G01L 5/0038* (2013.01)

(58) Field of Classification Search
CPC .......... F16F 2226/04; F16F 2230/0047; F16F 2226/02; F16F 2226/00; B21F 35/00; G01L 1/042; G01L 1/25; G01L 5/0038; G01N 2223/607; G01N 23/20
See application file for complete search history.

(56) References Cited

FOREIGN PATENT DOCUMENTS

| | | | |
|---|---|---|---|
| CN | 103076122 A | * | 5/2013 |
| CN | 103717775 | | 4/2014 |
| CN | 106970098 | | 7/2017 |
| EP | 3150880 | | 4/2017 |
| JP | 2005241308 | | 9/2005 |
| JP | 2010255742 | | 11/2010 |
| JP | 5188445 | | 4/2013 |
| JP | 2017218839 | | 12/2017 |
| SU | 1762026 | | 11/1990 |
| WO | 2010146898 | | 12/2010 |
| WO | 2017199959 | | 11/2017 |

OTHER PUBLICATIONS

He, B.B., Preckwinkel, U., and Smith, K.L. (1998). Advantages of using 2D detectors for residual stress measurements. Advances in X-ray Analysis. vol. 42. Dec. 31, 1998. pp. 429-438.
European Search Report for European Patent Application No. 19799638.2 dated Jan. 11, 2022.
Indian Office Action for Indian Patent Application No. 202017050449 dated May 26, 2021.
International Search Report and Written Opinion for International Application No. PCTJP2019018600 completed Jun. 4, 2019.
Utea, T., Sugiura, H. (1976). Measuring of sevelal points stress, attend to variation of end turn on the compression springs. Transactions of Japan Society of Spring Engineers. Mar. 25, 1976. vol. 1976(21). pp. 33-38.

* cited by examiner

METHOD FOR MANUFACTURING SPRING AND SPRING

TECHNICAL FIELD

This invention relates to a method for manufacturing a spring such as coil spring and a spring.

BACKGROUND TECHNOLOGY

Conventionally, the products of springs used for automotive parts such as coil springs are required not to have stress concentrated in a part of the spring when used under load from the viewpoint of weight reduction. The finite element method is used to design a spring so that the stress distribution due to the shape of the spring is optimal when a set load is applied, whereas it is difficult to inspect the stress distribution of the actual product under load. In fact, the stress in the spring needs to be evaluated considering both the stress caused by the shape of the spring and the residual stress imparted by the shot peening.

Currently, the stress caused by the shape of a spring is inspected by measuring the external shape of the spring and simulating it using the analysis of the finite element method under an assumed load. Residual stress after the shot peening is inspected by destructive inspection and therefore with no load applied. In patent document 1, a method of measuring the residual stress of a product after the shot peening by nondestructive inspection of each product is presented.

PRIOR ART DOCUMENT

Patent Document

Patent Document 1: WO 2017/199959 A1

SUMMARY OF THE INVENTION

The Problem to be Solved by the Invention

The patent document 1 discloses an invention to inspect the effect of only the shot peening process, whereas the spring as an actual product is affected by the previous process, and the shape changes under load and thereby the stress distribution changes significantly. In other words, the patent document 1 is insufficient for the evaluation of the spring as a product. Therefore, a method for manufacturing a spring and a spring that enable the stress distribution of the spring to be inspected under load are required.

The present embodiment is proposed in view of the above-mentioned actual situation, and is intended to provide a method for manufacturing a spring and a spring for inspecting the stress distribution of a spring under load.

Means for Solving the Problem

In order to solve the aforementioned issues, a method for manufacturing a spring according to the present invention includes the steps of applying a load to a spring, measuring a stress of the spring under the load, and releasing the load applied to the spring. The step of measuring the stress of the spring may include measuring the stress on a surface of an active part of the spring using X-ray diffraction with cos a method. The step of applying a load to the spring may include retaining the load with a jig. The load to be applied may be from 0 to the maximum load in use. Further, the load is also assumed to be applied in accordance with the layout and purpose in which the spring is installed.

The method of manufacturing a spring according to the present invention may include a step of determining whether a magnitude of the measured stress of the spring meets a criterion. When it is determined that the criterion is not met in the step of determining, the spring is eliminated as defective product.

The spring may be, but is not limited to, a coil spring, a leaf spring, a stabilizer, a torsion bar, or a disc spring. The spring of the present invention includes a product manufactured by the above-mentioned method.

Effect of the Invention

According to the present invention, a spring with an inspected stress distribution under load can be manufactured, and a spring designed for weight reduction can be stably supplied.

EMBODIMENT FOR IMPLEMENTING THE INVENTION

The method for manufacturing a spring and the spring of the present embodiment will be described in detail as below with reference to the drawings. In the present embodiment, it is assumed that, but is not limited to, a coil spring of material diameter (d) 13 mm, mean diameter of coils (D) 112 mm, free height (H) 326 mm, number of active coils (Ne) 4.1, total number of coils (Nt) 5.5, and the material of SUP 12 is produced by hot forming as a spring. Also, it may be applied to other types of springs, and may be applied to the cold forming.

Figure 1:
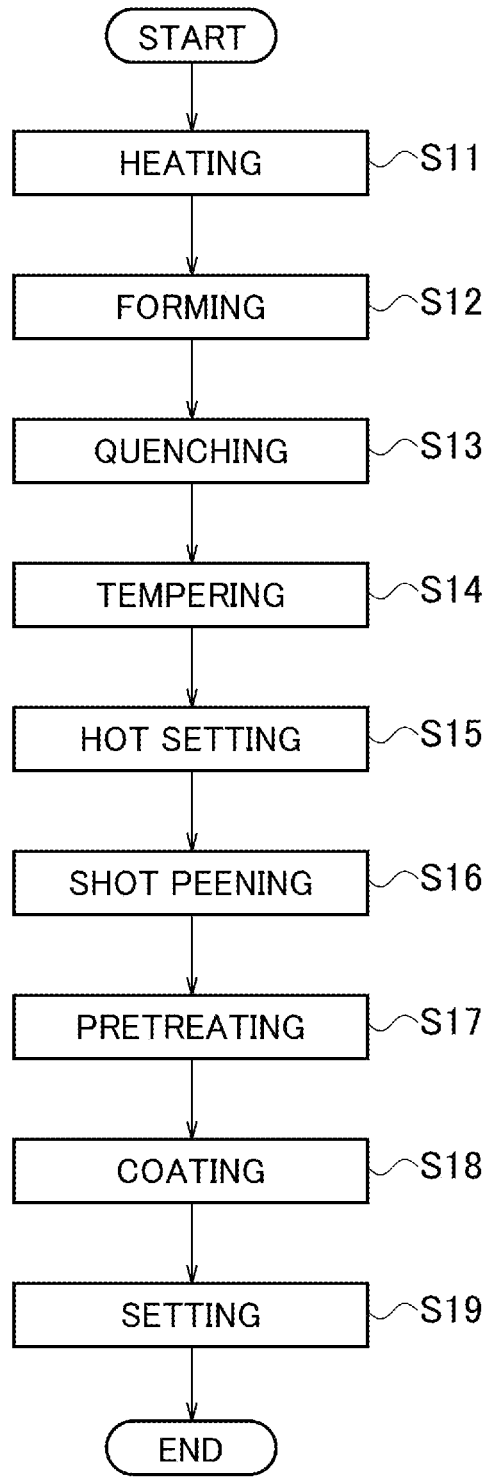
FIG. 1 shows a flowchart illustrating a series of steps of the method for manufacturing a spring of the present embodiment.

FIG. 1 shows a flowchart illustrating a series of steps in the method for manufacturing a spring of the present embodiment. In the present embodiment, a bar is heated in step S11, the bar is formed into a coiled spring in step S12, the spring is quenched in step S13, tempered in step S14, and hot setting is applied in step S15. Hot setting relieves the plastic deformation in use by loading the spring with an overload in a heated state and causing it to deform plastically in advance. In step S16, the spring is shot-peened. The shot peening imparts a predetermined amount of compressive residual stress to the surface of the spring. In step S17, the spring is pretreated for coating, and in step S18, the spring is coated. In step S19, the spring is loaded with overload at room temperature, and the spring is pre-settled for plastic deformation, thereby relieving the plastic deformation in use.

Figure 2:
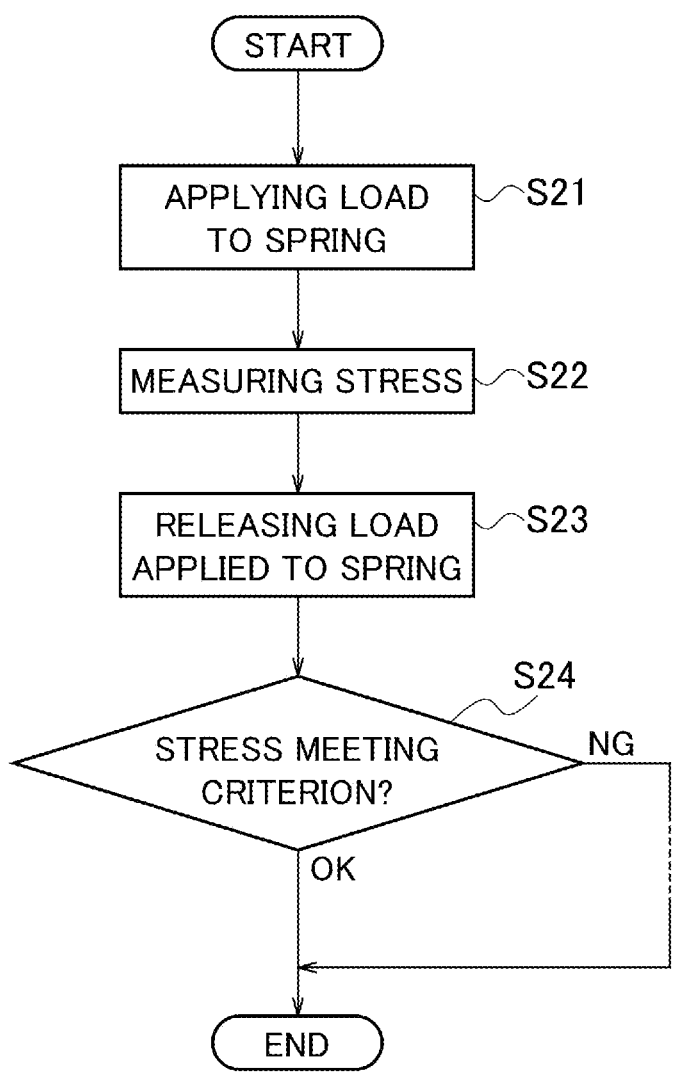
FIG. 2 shows a flowchart illustrating a process of measuring stress distribution under load in the method for manufacturing a spring of the present embodiment.
Figure 3:
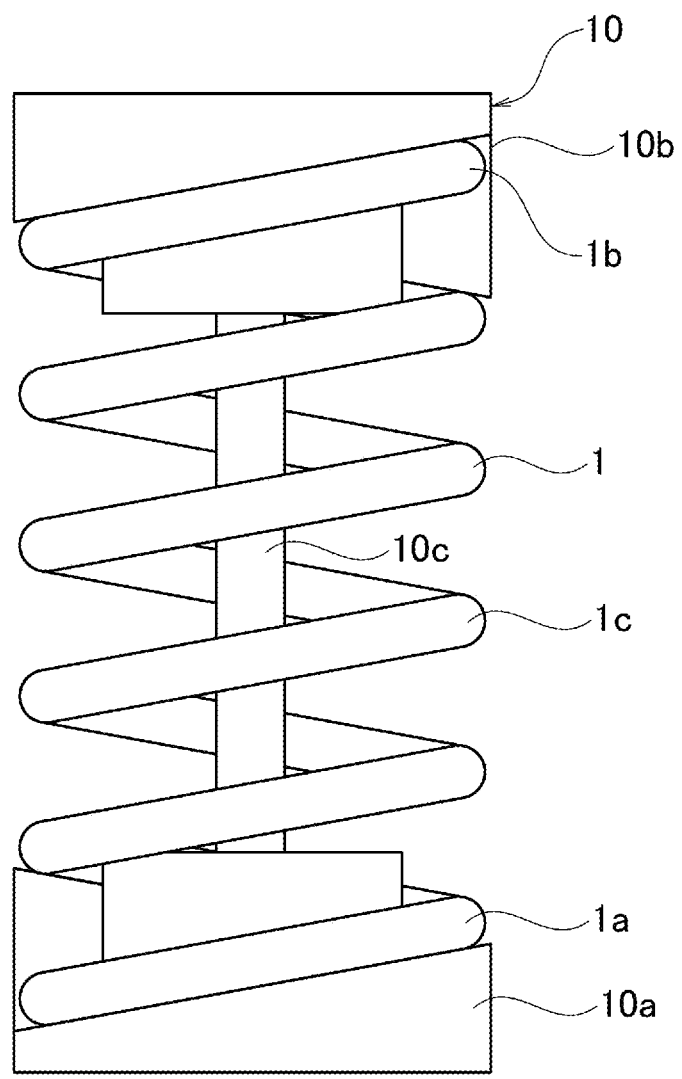
FIG. 3 shows a front view of a spring to which a load is applied by a jig.

FIG. 2 shows a flowchart illustrating the step of measuring the stress distribution under load. In step S21, a predetermined load is applied to the spring. FIG. 3 shows a front view of the spring 1 with a load loaded by jig 10.

In FIG. 3, the coil spring 1 is supported by a lower support part 1a and an upper support part 1b of the jig 10, with the lower end turn 1a supported by the lower support part 10a of the jig 10 and the upper end turn 1b supported by the upper support part 10b of the jig 10. The distance between the lower support part 10a and the upper support part 10b can be varied along the shaft 10c connecting the lower support part 10a and the upper support part 10b, and is set so that a predetermined load is applied to the spring 1. In the present embodiment, a load of 7,200 N is assumed to be loaded to compress.

In step S22, the stress of the spring is measured. In this embodiment, the stress of the spring 1 is measured using X-ray diffraction with cos α method.

Figure 4:
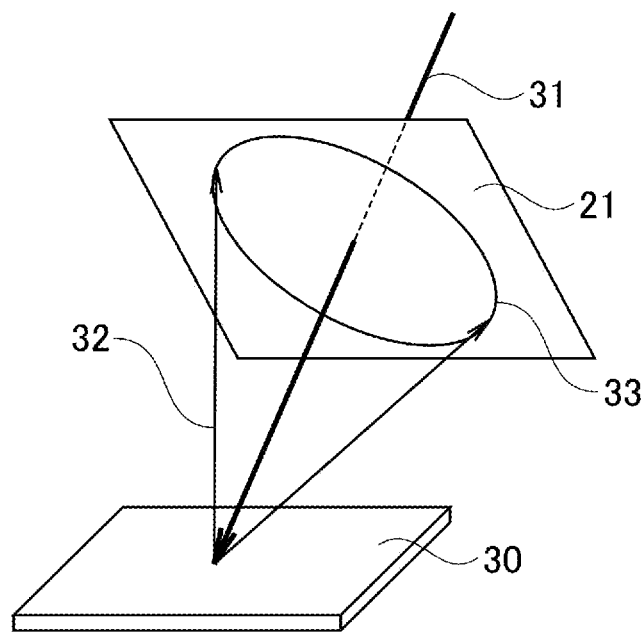
FIG. 4 shows an overview diagram illustrating the measurement of stress using X-ray diffraction with cos a method.

FIG. 4 shows an overview view illustrating the measurement of stress using X-ray diffraction by the cos α method. In the method for manufacturing a spring of the present embodiment, an X-ray diffraction stress measurement device for measuring stress by the cos α method is employed. The X-ray diffraction stress measurement device irradiates X-rays 31 at a desired position on the sample 30 and detects the Debye ring 33 by the diffracted X-rays 32 in the detection plane 21 of the X-ray diffraction stress measurement device all around, and thereby measuring the stress in a single irradiation.

Figure 5:
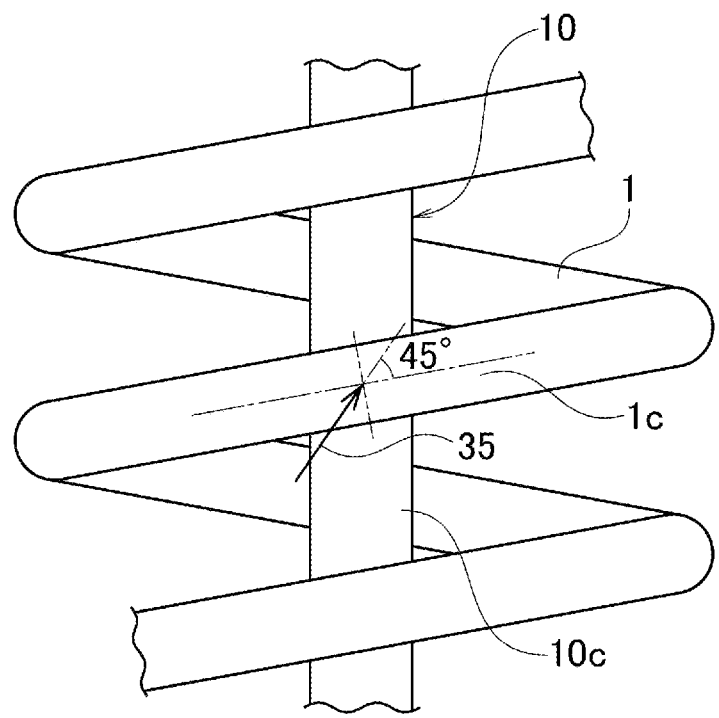
FIG. 5 shows a partially enlarged frontal view of a spring showing the direction in which stress is measured.

FIG. 5 is a partially enlarged front view showing the direction in which the stress is measured in the spring. In this embodiment, the torsional shear stress was measured on the outer surface of the active part 1c, excluding the lower end turn 1a and the upper end turn 1b of spring 1. The stresses were measured in a direction of 45 degrees with respect to the direction in which the wire of the spring 1 extends, as shown by arrow 35 in FIG. 5.

Figure 6:
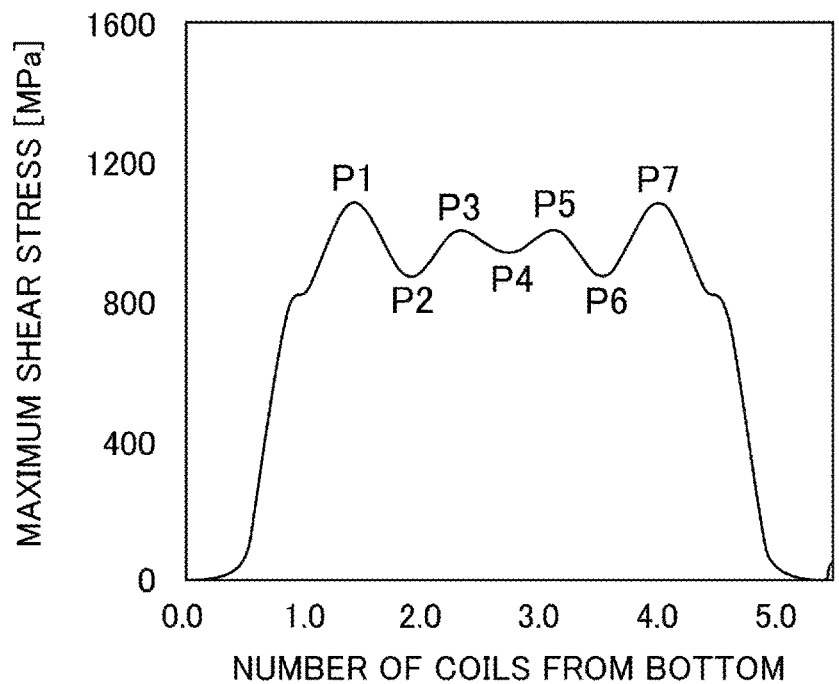
FIG. 6 shows a diagram illustrating the stress distribution due to a change in the shape of a spring calculated by the finite element method.

Table 1 shows the results of the stresses measured by the X-ray diffraction stress measurement system. The units of stress are in MPa. The stresses were measured three times at seven positions from position P1 to position P7 in order from the bottom in the spring 1 and the average of the measurements was taken. The positions P1 to P7 were set at the peaks and valleys where the stresses are maximum and minimum based on the results of the finite element analysis shown in FIG. 6.

Figure 7:
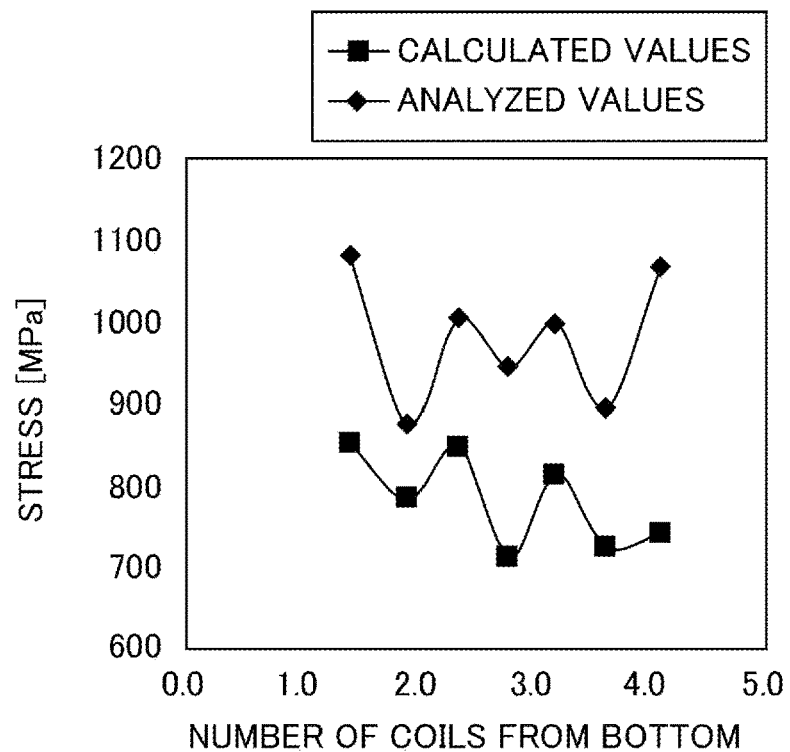
FIG. 7 shows a graph comparing the difference between measured stress values and the analyzed values by the finite element method under load and no load, respectively.

The stresses were measured with a load of 0 N (Newton, hereinafter the same) under no load and 7,200 N under load. The difference between these measured values was used as the calculated value and compared with the calculated value by the finite element method. As shown in Table 1, deviations between the calculated and analytical values are observed, and it is clear that stress measurement under load is necessary for the evaluation of the spring products. FIG. 7 is a graph comparing the difference between the measured stress values under load and unloaded conditions and the analytical values using the finite element method. Similar to the results in Table 1, there is a deviation between the measured stress values and the analytical values based on the finite element method.

In step S23 of FIG. 2, the load of spring 1 is released. The spring 1 is removed from the jig 10 because the measurement of the stress with the load applied in step S22 has been completed. This releases the spring 1 from the load.

In step S24, it is determined whether the stress measured in step S22 meets the criterion or not. For example, if the measured stress meets the criterion, it is determined to be OK, and if it does not meet the criterion, it is determined to be not good.

In the present embodiment, the spring 1 loaded with the jig 10 is placed on the upper surface of the mount and measured individually by the X-ray diffraction stress measurement device, but instead, stress may be measured for all of the plural springs 1 flowing in the line. For this purpose, a load may be loaded on the springs 1 flowing through the line beforehand by means of a jig 10 or the like, and a predetermined position of the springs 1 may be measured by one or more X-ray diffraction stress measurement devices.

Figure 8:
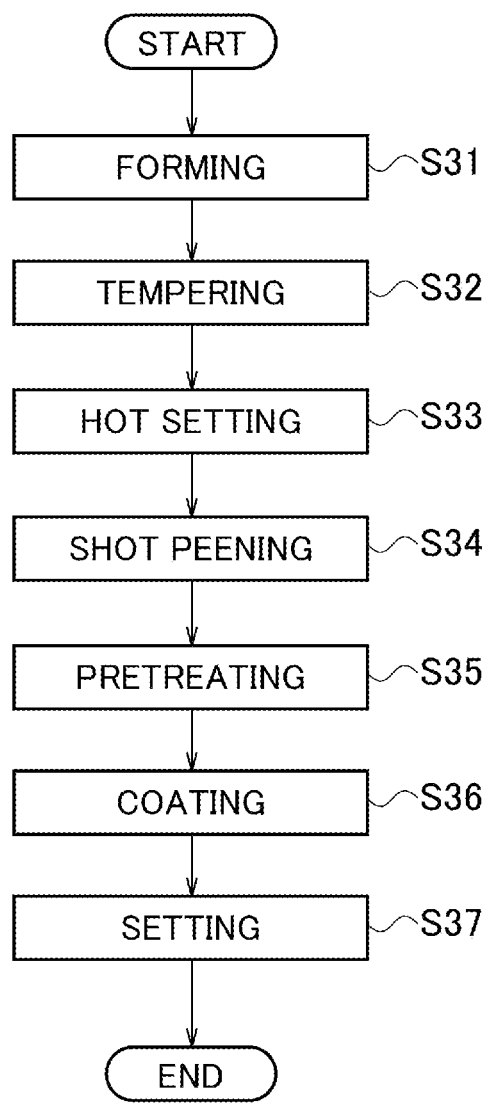
FIG. 8 shows a flowchart illustrating a series of steps of the method for manufacturing a spring of the present embodiment applied to a cold forming.

FIG. 8 is a flowchart illustrating a series of processes of the method for manufacturing a spring of the present embodiment applied to the cold forming. In the case of the cold forming, the reel material is formed into a coiled spring at ambient temperature in step S31, the spring is tempered in step S32, the spring is subject to hot-setting in step S33, the spring is shot-peened in step S34, the spring is pretreated for coating in S35, and the spring is coated in step S36. In step S37, the spring is loaded with overload at room temperature and the spring is subjected to setting that causes plastic deformation in advance, thereby relieving the plastic deformation in use. The same is true in the case of the cold forming in that the series of processes shown in FIG. 2 are carried out.

In the method for manufacturing a spring of the present embodiment, the stress distribution of the spring under load is directly measured by using an X-ray diffraction stress measurement device using the cos α method. Therefore, an

TABLE 1

| | | MEASURED VALUE | | | |
| POSITION | NUMBER OF COILS FROM BOTTOM | NO LOAD (a) | UNDER LOAD (b) | CALCULATED VALUE (b − a) | ANALYZED VALUE |
| --- | --- | --- | --- | --- | --- |
| P1 | 1.4063 | −1107 | −241 | 866 | 1084 |
| P2 | 1.9063 | −1035 | −249 | 785 | 877 |
| P3 | 2.3438 | −1084 | −245 | 839 | 1005 |
| P4 | 2.7813 | −1024 | −314 | 710 | 947 |
| P5 | 3.1875 | −1025 | −230 | 795 | 998 |
| P6 | 3.6250 | −947 | −224 | 723 | 895 |
| P7 | 4.0938 | −920 | −208 | 713 | 1067 | accurate stress distribution of the spring under load can be confirmed, and thus the spring designed with weight reduction can be stably supplied.

INDUSTRIAL APPLICABILITY

The present invention may be applied to a method for manufacturing a spring such as a coil spring and a spring.

DESCRIPTION OF SYMBOLS

1 spring
10 jig

The invention claimed is:

1. A method for manufacturing a spring, comprising the steps of:
   applying a load to the spring;
   measuring a stress of the spring under the load; and
   releasing the load applied to the spring,
   wherein measuring of the stress of the spring comprises measuring the stress on a surface of an active part of the spring using X-ray diffraction with cos α method.

2. The method according to claim 1, further comprising determining whether a magnitude of the measured stress of the spring meets a criterion.

3. The method according to claim 2, wherein the applying of the load to the spring comprises retaining the load by a jig.

4. The method according to claim 1, wherein the spring comprises a coil spring.

* * * * *